(12) United States Patent
Varoglu et al.

(10) Patent No.: US 9,167,388 B2
(45) Date of Patent: Oct. 20, 2015

(54) METHOD AND APPARATUS FOR AUTOMATICALLY ADJUSTING THE OPERATION OF REMINDERS BASED ON DEVICE EVENT HISTORY

(71) Applicant: Apple Inc., Cupertino, CA (US)

(72) Inventors: Devrim Varoglu, Santa Clara, CA (US);
Natalia Ziemianska, Cupertino, CA (US); Ravisastry R. Parupudi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 13/745,284

(22) Filed: Jan. 18, 2013

(65) Prior Publication Data

US 2014/0206328 A1 Jul. 24, 2014

(51) Int. Cl.
*H04W 4/12* (2009.01)
*H04W 4/02* (2009.01)
*H04M 1/00* (2006.01)
*G06Q 10/10* (2012.01)
*G06Q 30/02* (2012.01)

(52) U.S. Cl.
CPC ............ *H04W 4/028* (2013.01); *G06Q 10/109* (2013.01); *H04M 1/00* (2013.01); *G06Q 30/0207* (2013.01)

(58) Field of Classification Search
USPC ............. 455/418, 437, 445, 456.1, 456, 518, 455/522
See application file for complete search history.

(56) References Cited

U.S. PATENT DOCUMENTS

2009/0247128 A1\* 10/2009 Honda et al. ................. 455/411
2010/0159975 A1\* 6/2010 Shaffer et al. ................ 455/516
2013/0316744 A1\* 11/2013 Newham et al. .............. 455/458

\* cited by examiner

*Primary Examiner* — Sam Bhattacharya
(74) *Attorney, Agent, or Firm* — Blank Rome LLP

(57) ABSTRACT

A processor-based personal electronic device (such as a smartphone) uses combinatorial logic to automatically adjust alarms, notifications reminders, and the like based on data from device event histories, on-board sensors, user-entered data, and similar information. One particular representative embodiment comprises a process for automatically deleting an unneeded reminder. For example, a user may have a personal electronic device that is set to issue a reminder for a meeting in a certain place, on a certain date at a certain time. If location sensors detect that the user is already at the certain place on the certain date at (or reasonably before) the certain time the now superfluous reminder is automatically cancelled.

23 Claims, 8 Drawing Sheets

METHOD AND APPARATUS FOR AUTOMATICALLY ADJUSTING THE OPERATION OF REMINDERS BASED ON DEVICE EVENT HISTORY

BACKGROUND OF THE INVENTION

This invention relates to personal electronic devices. More particularly, it relates to the alarm, reminder and notification functions of smartphones.

A smartphone is a mobile phone built on a mobile operating system and having advanced computing capability and connectivity. The first smartphones combined the functions of a personal digital assistant (PDA) with a mobile phone. Later models added the functionality of portable media players, compact digital cameras, pocket video cameras, and GPS navigation units to form one multi-use device. Many current smartphones also include high-resolution touchscreens for input and web browsers that display standard web pages as well as mobile-optimized sites. High-speed data access may be provided by Wi-Fi and/or Mobile Broadband.

Wi-Fi is a widely-used technology that allows an electronic device to exchange data wirelessly (using radio waves) over a computer network, including high-speed Internet connections. The Wi-Fi Alliance defines Wi-Fi as any "wireless local area network (WLAN) products that are based on the institute of Electrical and Electronics Engineers' (IEEE) 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or "hotspot") typically has a range of about 65 feet (20 meters) indoors and a greater range outdoors. Hotspot coverage can comprise an area as small as a single room with walls that block radio waves or as large as many square miles—this may be achieved by using multiple overlapping access points.

Mobile broadband is the term used for wireless Internet access through a portable modem, mobile phone, USB wireless modem, or other mobile devices. A smartphone is basically a cellular telephone with built-in applications and Internet access. In addition to digital voice service, current smartphones provide text messaging, e-mail, Web browsing, and video playback and calling. In addition to their built-in functions, smartphones can run myriad free and paid applications, turning the cellphone into a mobile personal computer.

In addition to radio transmitters and receivers for interacting with cellular telecommunications systems, many smartphones have additional sensors that provide input to their various systems. For example, Apple Inc.'s iPhone® 5 smartphone includes at three-axis gyro, an accelerometer, a proximity sensor and an ambient light sensor.

The iPhone display may respond to a number of sensors. A proximity sensor deactivates the display and touchscreen when the device is brought near the face during a call. This is done to save battery power and to prevent inadvertent inputs from contact with the user's face and ears. An ambient light sensor adjusts the display brightness which in turn saves battery power. A 3-axis accelerometer senses the orientation of the phone and changes the screen accordingly, allowing the user to easily switch between portrait and landscape mode. Photo browsing, web browsing, and music playing support both upright and left or right widescreen orientations.

BRIEF SUMMARY OF THE INVENTION

A processor-based personal electronic device (such as a smartphone) is programmed to automatically adjust alarms, notifications, reminders, and the like based on a combination of data from device event histories, on-board sensors, user-entered data, and the like.

In one particular representative embodiment, the invention comprises a process for automatically deleting an unneeded reminder. For example, a user's personal electronic device is set to issue a reminder for a meeting in a certain place, on a certain date at a certain time. If the system's location sensors detect that the user is at the certain place on the certain date at or reasonably before the certain time, the now superfluous reminder is automatically cancelled.

BRIEF DESCRIPTION OF THE SEVERAL VIEWS OF THE DRAWING(S)

DETAILED DESCRIPTION OF THE INVENTION

Figure 1:
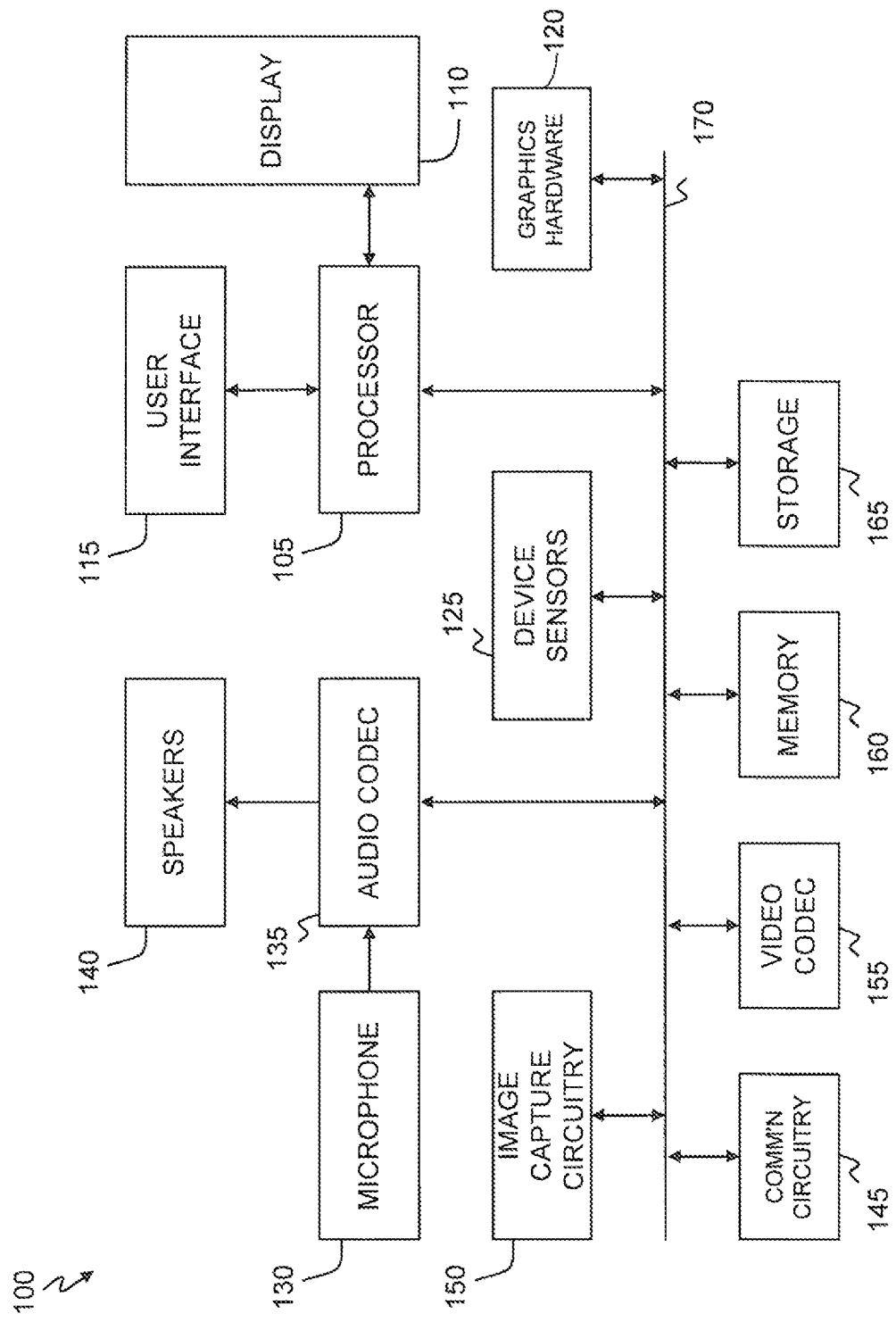
FIG. 1 is a block diagram of a processor-based device.

Referring to FIG. 1, a simplified functional block diagram of illustrative electronic device 100 is shown according to one embodiment. Electronic device 100 could, for example, be a smartphone, personal media device, portable camera, or a tablet, notebook or desktop computer system. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, image capture circuit or unit 150, video codec(s) 155, memory 160, storage 165, and communications bus 170.

Processor 105 may execute instructions necessary to carry out or control the operation of many functions performed by device 100 (e.g., such as the processing of data obtained from device sensors 125). Processor 105 may, for instance, drive display 110 and receive user input from user interface 115. User interface 115 can take a variety of forms such as a button, keypad, dial, a click wheel, keyboard, display screen and/or a touch screen. Processor 105 may be a system-on-chip such as those found in mobile devices and include one or more dedicated graphics processing units (GPUs). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 perform computational tasks. In one embodiment, graphics hardware 120 may include one or more programmable graphics processing units (GPUs).

Image capture circuitry 150 may capture still and video images that may be processed to generate images. Output from image capture circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory Memory (EPROM), and Electrically Erasable Programmable Read-Only Memory (EEPROM). Memory 160 and storage 165 may be used to retain computer program instructions or code organized into one or ore modules and written in any desired computer programming language. When executed by, for example, processor 105 such computer program code may implement one or more of the methods described herein 160 may include one or more different types of media used by processor 105, graphics hardware 120, and image capture circuitry 150 to perform device functions. For example, memory 160 may include memory cache, read-only memory (ROM), and/or random access memory (RAM). Storage 165 may store media (e.g., audio, image and video files), computer program instructions or software, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory.

The invention may best be understood by reference to the following examples and exemplary embodiment(s) illustrated in the drawing figures. Methods according to the invention allow a processor-based device such as a smartphone to dynamically set and/or reset reminders based on device event history—e.g., recent calls, e-mails, other electronic communications (such as those sent or received via iMessage® personal wireless digital messaging services), Passbook® scans, device location, device motion, and the like. Passbook programs comprise computer software for organizing, storing, providing access to, redeeming, and providing information about goods, services, discounts, tickets, boarding passes, coupons, consumer loyalty programs, and gift cards concerning a wide range of consumer products, services, and cultural, sporting and entertainment events as well as computer software for downloading vouchers and tickets for admission to sporting, cultural and entertainment events.

Example 1

Figure 2:
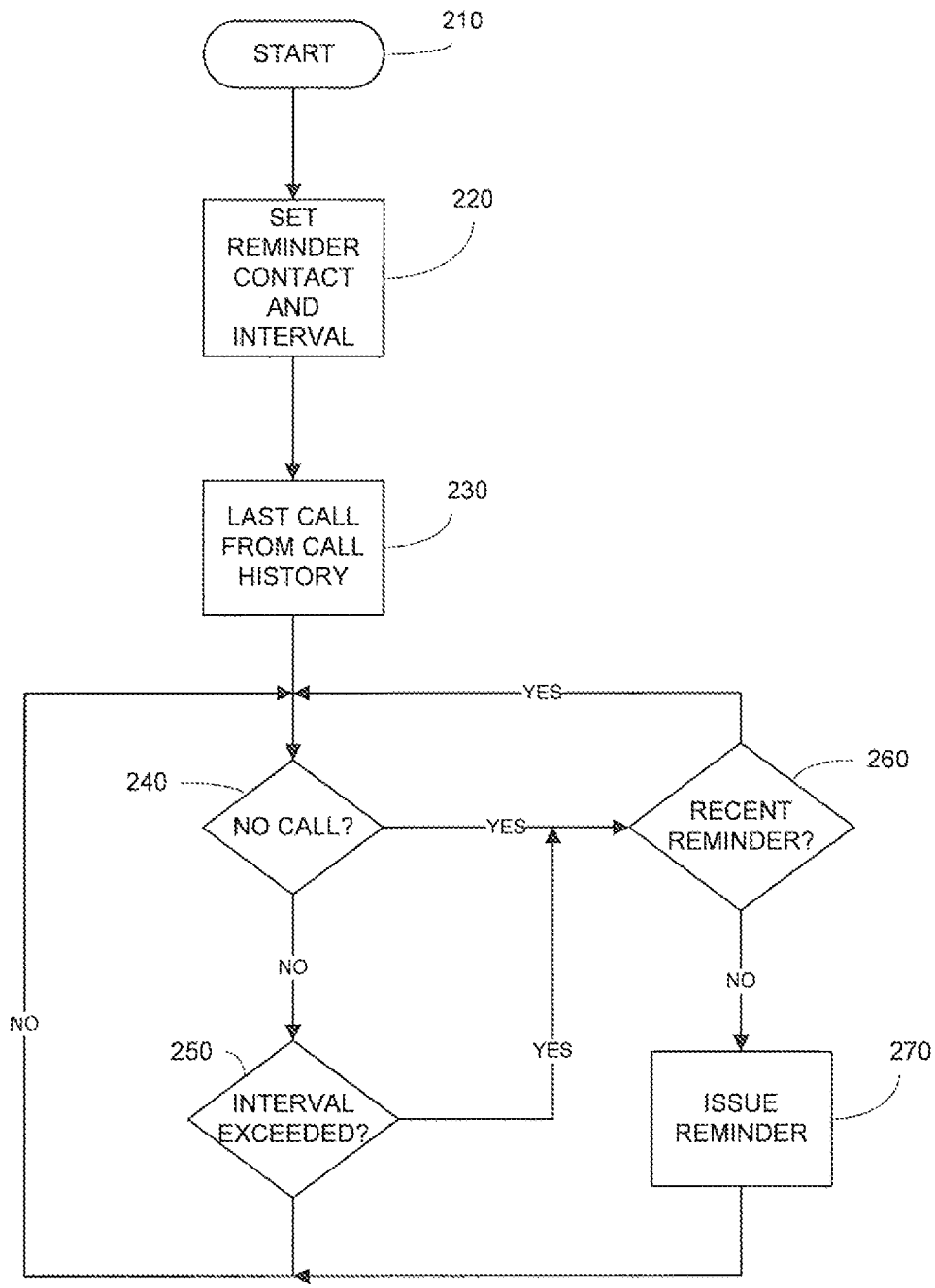
FIG. 2 is flowchart of a process according to a first representative embodiment of the invention.

Referring now to exemplary process 200 illustrated in flowchart form in FIG. 2, it may be seen how the invention may be used to trigger a user-selected reminder if a certain event has not occurred within a certain period of time. A representative example of this would be a reminder to call a certain person (or certain phone number) if the user has not, called them for more than a week. This reminder is repetitive but does not happen [issue] unless the condition is, met. In this case, the inputs may be; 1) call history (is there an instance of an incoming/outgoing call for a specified contact?); 2) when was the last phone call with the specified contact?; and, 3) was the last phone call more than 7 days ago?

The process may begin at 210 with the user selecting the function on his or her device. At 220, the user may be prompted to input the particular reminder contact (which may be an entry in the user's contact list and/or a phone number) and the desired maximum interval for calls to (or from) the contact.

At 230, the device may retrieve the most recent call to or from the designated contact. The data concerning this call may include the date of the call. At 240 the device may determine whether there is any call history for the designated contact—i.e., has the user ever called or been called by the contact? If not ("Yes" branch at 240), the device may determine whether a recent reminder has been issued for calling this contact (decision diamond 260). If a recent reminder has been issued ("Yes" branch at 260) the process may loop back to 240 until the reminder is no longer "recent" at which point ("No" branch at 260) a reminder may be issued at 270 (which resets the "recency" timer) and the process loops back to decision diamond 240.

If it is determined (at 240) that a call to or from the designated contact has occurred ("No" at 240), the system may test (at diamond 250) the date of the most recent call to or from the contact to determine whether the interval between calls exceeds the pre-selected maximum interval. If so ("Yes" branch at 250), the system may determine whether a recent reminder regarding this contact has been issued. If not ("No" branch at 260), the system may proceed to issue a reminder at 270 (which may reset the recency timer) and the process may loop back to continue monitoring the frequency of calls to or from the designated contact.

Example 2

In this example, the user of a personal electronic device wishes to be reminded to keep in touch with a certain person at least once a month. In performing this task, the device may take data from: 1) the call history stored on the device (is there an instance of an incoming/outgoing call for a specified contact?); 2) e-mail history; 3) other electronic communication history (e.g., iMessage history); and, 4) social media communications (Facebook, Twitter, etc. . . . ). After retrieving such data, the device may determine the date of the last communication with the specified contact. The most recent communication may have been initiated by the user or by the specified contact. If the last communication is found to be more than 30 days old, the system may issue a reminder to the user that it has been more than a month since he or she last communicated with the designated person.

Figure 3:
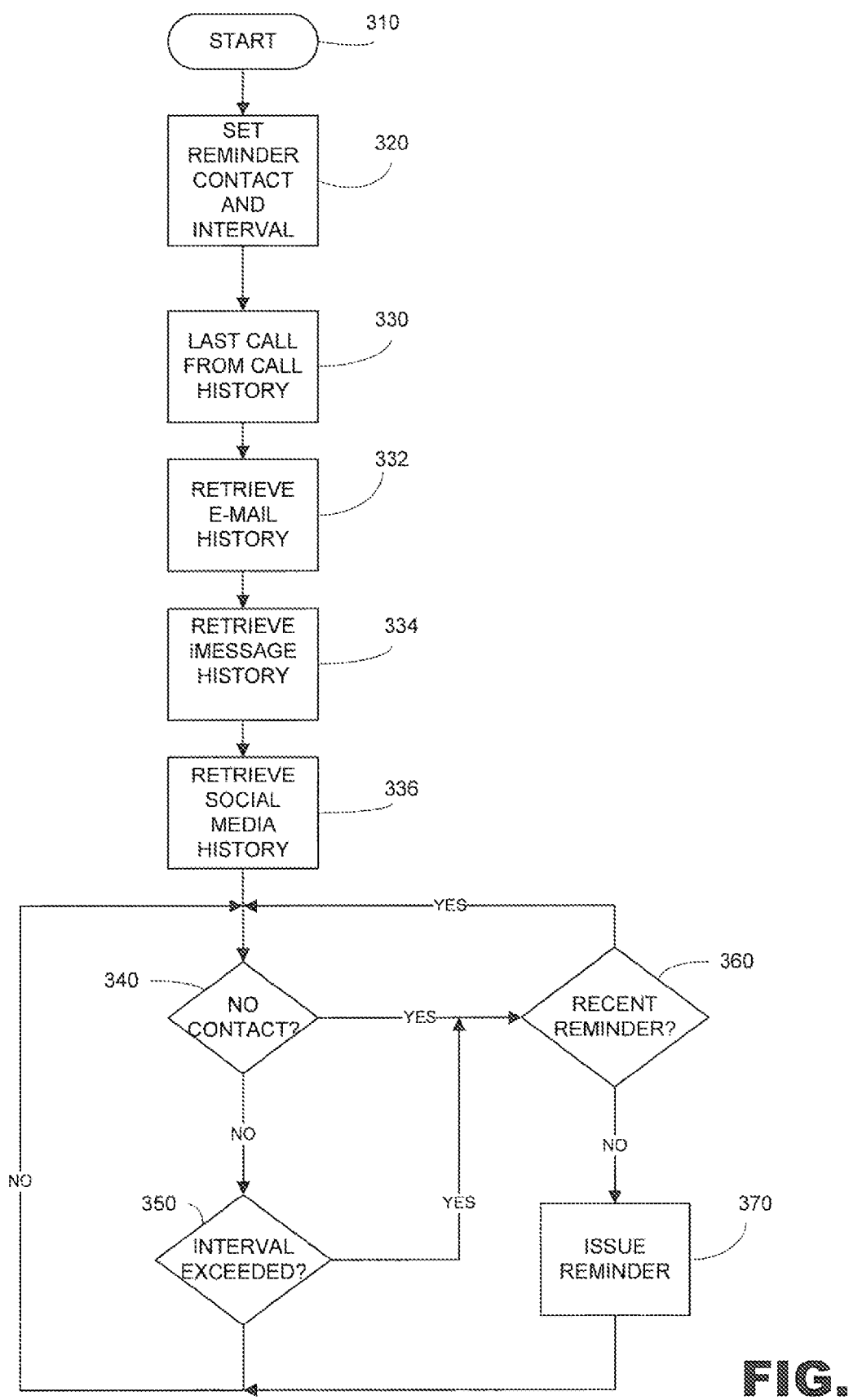
FIG. 3 is flowchart of a process according to a second representative embodiment of the invention.

A process for accomplishing this task is illustrated in flowchart form in FIG. 3. The process may begin at 310 with the user selecting the function on his or her device. At 320, the user may be prompted to input the particular reminder contact (which may be an entry in the user's contact list and/or a phone number) and the desired maximum interval for communication to (or from) the contact.

At 330, the device may retrieve the most recent call to or from the designated contact. The data concerning this call may include the date of the call. At 332, the device may retrieve the most recent e-mail to or from the designated contact. The data concerning this e-mail may include the date of the e-mail. At 334, the device may retrieve the most recent electronic message (iMessage, SMS, etc.) to or from the designated contact. The data concerning this message may include the date of the message. At 336, the device may retrieve the user's most recent contact via social media with the designated contact. The data concerning this contact may include the date of the contact.

At 340 the device may determine whether there is any communication history on the device for the designated contact—i.e., has the user ever communicated with the contact?

If not ("Yes" branch at 340), the device may determine whether a recent reminder has been issued for keeping in touch with this contact (decision diamond 360). If a recent reminder has been issued ("Yes" branch at 360) the process may loop back to 340 until the reminder is no longer "recent" at which point ("No" branch at 360) reminder may be issued at 370 (which resets the "recency" timer) and the process loops back to decision diamond 340.

If it is determined (at 340) that a communication to or from the designated contact has occurred ("No" branch at 340), the system may test (at diamond 350) the date of the most recent communication with the contact to determine whether the interval between communications has exceeded the pre-selected maximum interval. If so ("Yes" branch at 350), the system may determine whether a recent reminder regarding this contact has been issued. If not ("No" branch at 360), the system may proceed to issue a reminder at 370 (which may reset the recency timer) and the process may loop back to continue monitoring the frequency of the user's communication with the designated contact.

Example 3

In this example, a user of a personal electronic device wishes to be reminded to visit a certain person (who resides at a certain place) if they have not visited that person within a certain period of time.

Figure 4:
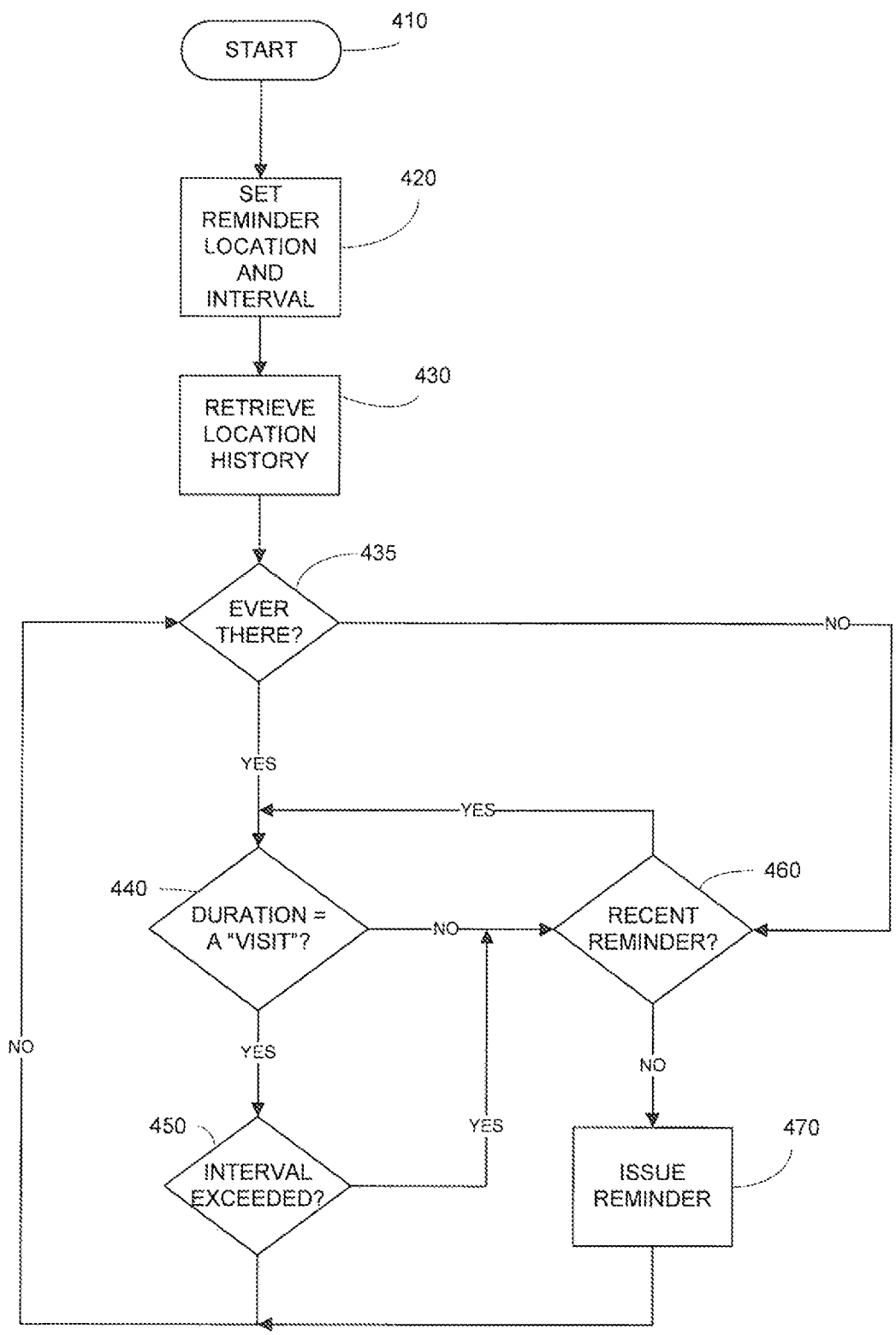
FIG. 4 is flowchart of a process according to a third representative embodiment of the invention.

A process for accomplishing this task is illustrated in flowchart form in FIG. 4. The process may begin at 410 with the user selecting the function on his or her device. At 420, the user may be prompted to input the particular reminder location (which may be an entry in the user's contact list) and the desired maximum interval for visiting the contact.

At 430, the device may retrieve the user's most recent visit to the designated location. The data concerning this visit may include the date of the call. At 435 the device may determine whether there is any history on the device for visiting the designated location—i.e., has the user ever visited with the contact person at the designated location? If not ("No" branch at 435), the device may determine whether a recent reminder has been issued for keeping in touch with this contact (decision diamond 460). If a recent reminder has been issued ("Yes" branch at 460) the process may loop back to 440 until the reminder is no longer "recent" at which point ("No" branch at 460) a reminder may be issued at 470 (which resets the "recency" timer) and the process loops back to decision diamond 435. If the user has never been to the designated location, then the duration of the "visit" to that location would be zero and the process would take the no branch at decision diamond 440.

If it is determined (at 435) that the user has been to the designated location ("Yes" branch at 435), the system may test (at diamond 440) how long the user remained at the location. If the duration exceeds a preselected value ("Yes" branch at 440), the event qualifies as a "visit" ("Yes" branch at 440) and the system may proceed to test (at decision diamond 450) whether the preselected maximum interval between visits has been exceeded. If so ("Yes" branch at 450), the system may determine whether a recent reminder regarding this location has been issued. If not ("No" branch at 460), the system may proceed to issue a reminder at 470 (which may reset the recency tinier) and the process may loop back to continue monitoring the frequency of the user's visits with the designated contact.

If, on the other hand, the user does not remain at the designated location long enough for the event to qualify as a "visit" ("No" branch at 440), the system may proceed to issue a reminder at 470 (which may reset the recency timer) and the process may loop back to continue monitoring the frequency of the user's visits with the designated contact. If a recent reminder has been issued ("Yes" branch at 460), additional reminders may be suppressed and the system may loop back to continue monitoring the user's visits to the site. In this way, the system does not issue superfluous reminders.

Example 4

If the user's location is at an establishment (retail establishment, restaurant, theater, etc.) for which the user has one or more electronic coupons (for example, in the Passbook application on his or her iPhone smartphone), the smartphone may be set to automatically remind the user to use the coupon. Representative program commands for such a function may include the following:

```
if ((user_location == GameStop) &&
PassbookAppHasCouponForGameStop))
remind user to use coupon
```

Figure 5:
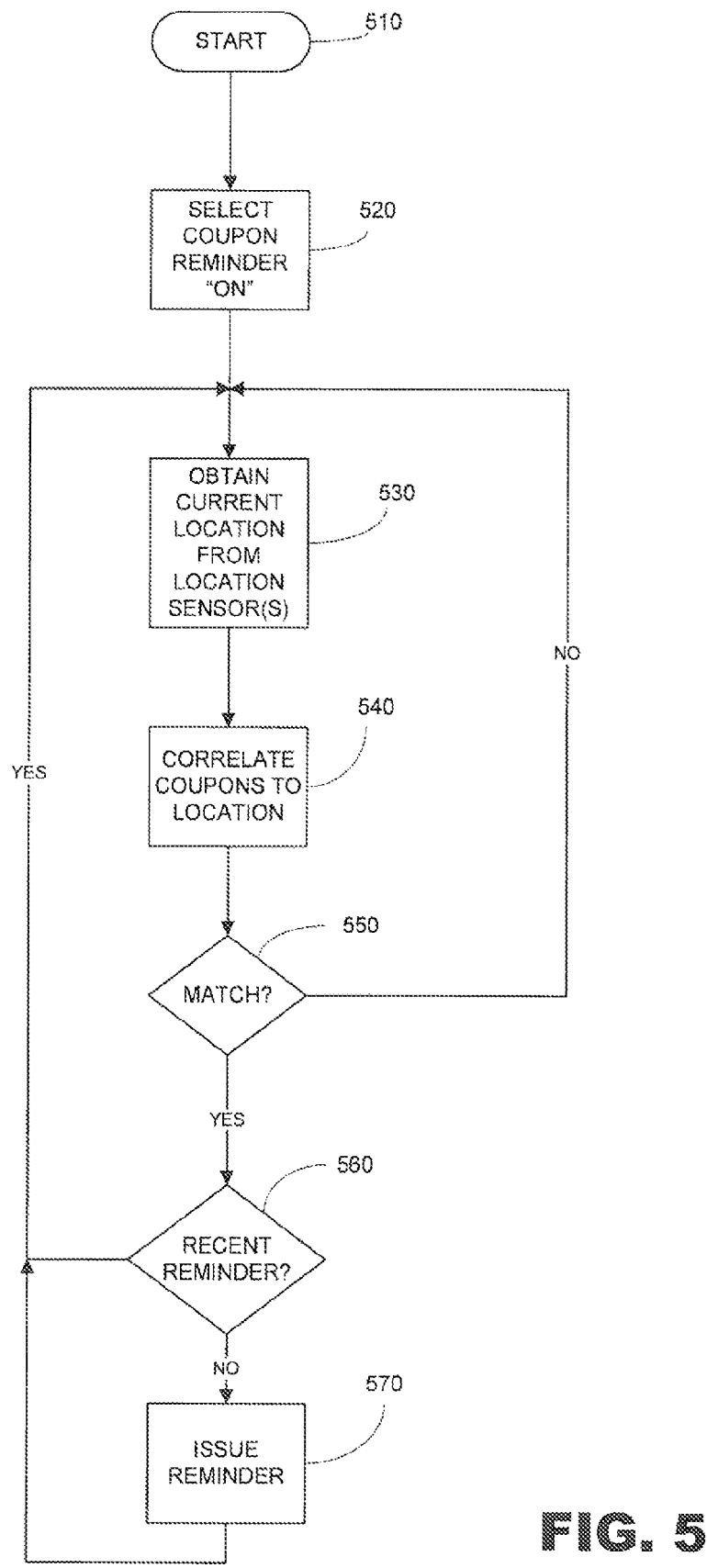
FIG. 5 is flowchart of a process according to a fourth representative embodiment of the invention.

A process for accomplishing this function is illustrated in flowchart form in FIG. 5. The process may begin at 520 with the user activating the function on his or her device. At 530, the device may obtain the user's current location from location sensors within the device—e.g., GPS receivers, WiFi transceivers, cellular phone system triangulation, etc.

At 540, the system may correlate the user's current electronic coupons with the determined user location. If no existing coupons match the current location ("No" branch at 550), the process may loop back to 530 and continue to monitor the user's location and test for matches with existing coupons. However, if a match is found ("Yes" branch at 550), the process may determine whether a recent reminder to use the coupon has been issued. If not ("No" branch at 560), the system may issue an appropriate reminder to the user (at 570) that he or she has an electronic coupon that may be used at his or her current location (and the reminder recency timer may be reset). If, on the other hand the device has recently issued a reminder concerning a particular coupon ("Yes" branch at 560), additional reminders may be suppressed and the process may loop back to 530 and continue to monitor the user's location and test for matches with existing coupons. In this way, the system does not constantly issue repeat reminders when a match between a coupon and the current location is detected.

Example 5

A personal electronic device incorporating the process of the present invention may use multiple sources of on-board data to notify a user if a certain, designated event has not occurred within a preselected interval. For example, a user may set his or her smartphone to notify him or her if they have not been in a movie theater for more than 3 months.

Figure 6:
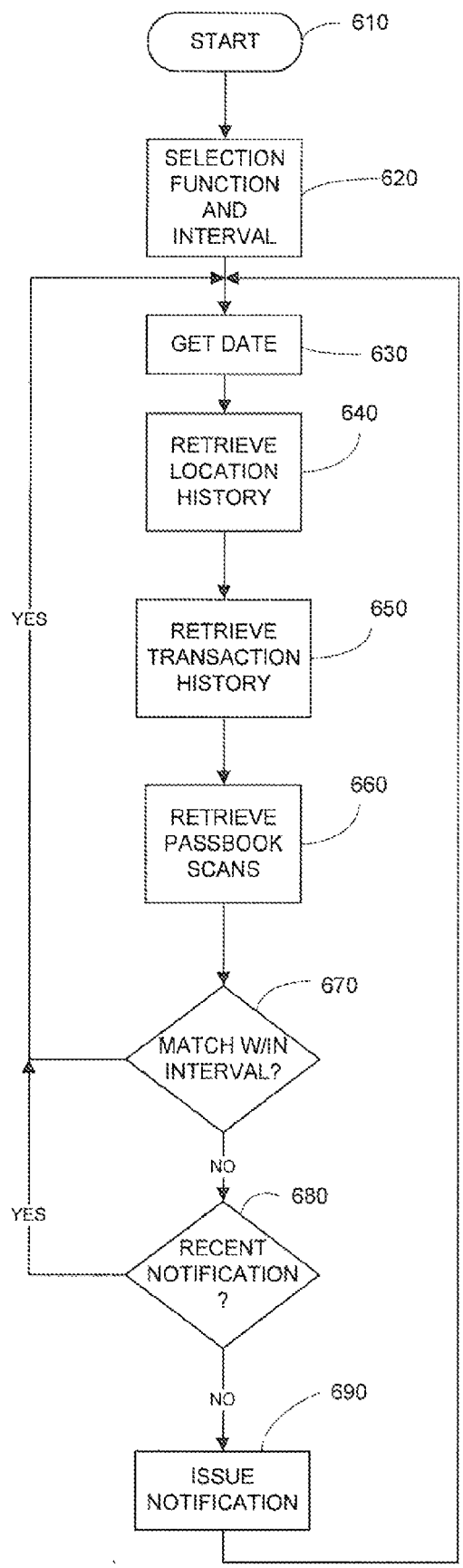
FIG. 6 is flowchart of a process according to a fifth representative embodiment of the invention.

A process for accomplishing this function is illustrated in flowchart form FIG. 6. The process may begin at 620 with the user activating the function on his or her device and inputting the interval between events that will trigger a notification. At 630, the device may obtain the current date from the calendar on the device and/or a data or telecommunications network to which the device may be connected. At 640 the system may retrieve the [recent] location history of the device which may be derived from location sensors within the device—e.g., GPS receivers, WiFi transceivers, cellular phone system triangulation, etc. The system may also retrieve the user's [recent] transaction history at 650 (such as electronic payments, coupon redemptions and the like) and (at 660) additional data such as recent Passbook scans of vouchers and tickets for admission to sporting, cultural and entertainment events.

At 670, the system may test the retrieved data for a match with the user-specified function within the selected time interval. In this particular example, the system may test for movie theater ticket scans, movie theater concession coupon redemptions and the user's presence at a movie theater location for more than an incidental length of time. If a match is found ("Yes" branch at 670) it may be inferred that the user has been to the movies within the last 3 months and thus pertinent notifications are suppressed and the system returns to 630 et seq. to monitor the user's movie-going activity.

If no match within the user's accumulated data is found ("No" branch at 60), the system may determine whether a notification has recently been issued (decision diamond 680). If a notification has recently been issued ("Yes" branch at 680), an additional notification is not issued and the system returns to 630 et seq. to monitor the user's movie-going activity. If there has not been a recent notification issued regarding the selected function ("No" branch at 680), a relevant notification may be issued at 690, the notification recency timer may be reset and the system returns to 630 et seq. to continue its monitoring of the user's movie-going activity, in this way, different types of data relating to user activity may be used to infer whether a particular event has occurred.

Example 6

Using the process of the invention, additional inputs can also be used to automatically cancel reminders that may be obsolete.

It should be appreciated that in Example 1 above, the reminder would never trigger if the user always has a phone conversation with the specified contact in the preceding 7 days. The reminder would be automatically cancelled at every instance of an incoming or outgoing call with the contact, and a countdown would be reset to the next 7-day limit.

Reminders for calendar appointments can also be cancelled in cases wherein the user is already at the meeting venue. Implementation of such a system may require indoor positioning technology at the user's location, as well as on the device being carried by the user.

Figure 7:
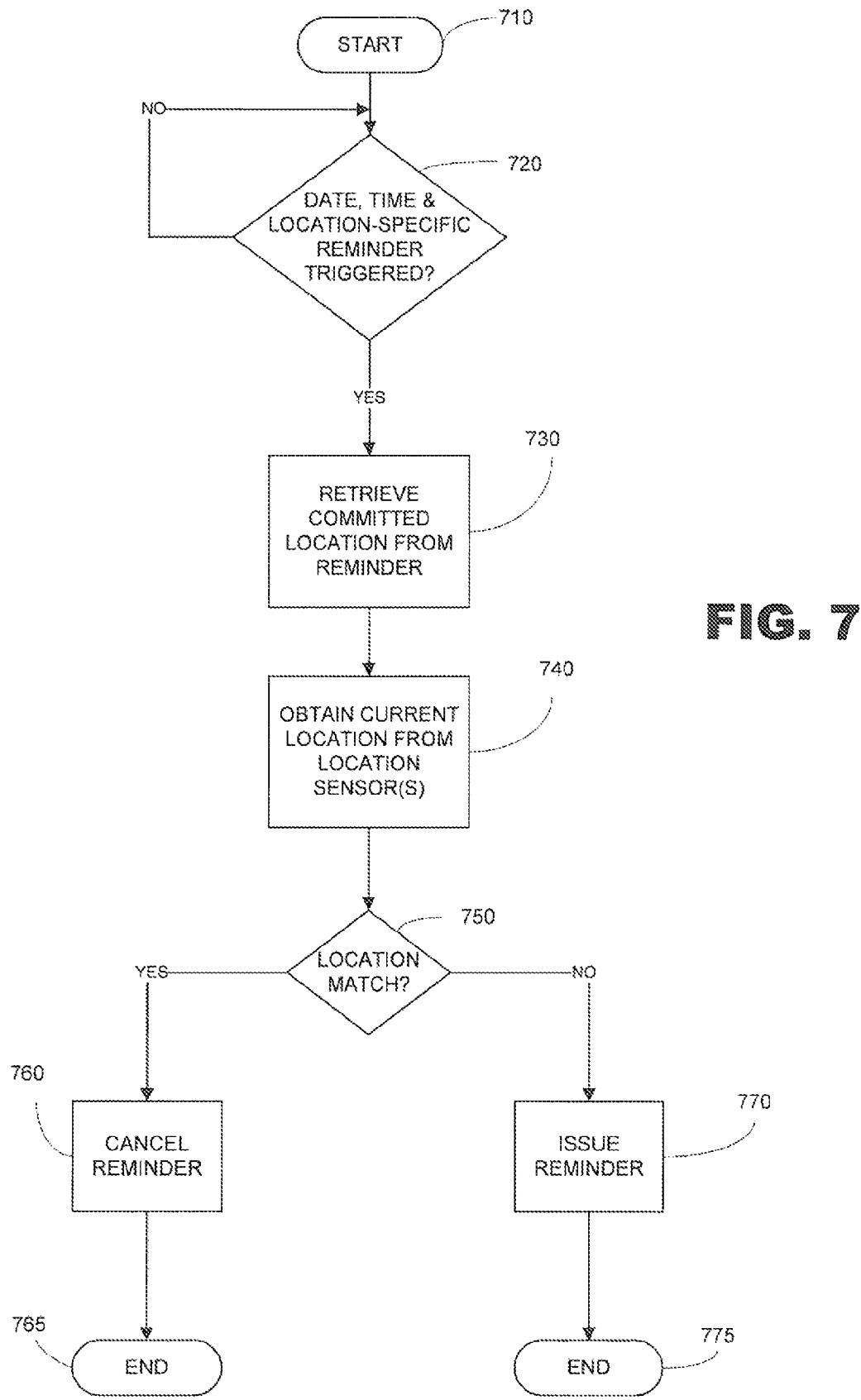
FIG. 7 is flowchart of a process according to a sixth representative embodiment of the invention.

A representative process for automatically cancelling a meeting reminder if the user is already at the specified meeting location is illustrated in flowchart form in FIG. 7. The process may begin at 710 with the user activating the feature on his or her personal electronic device which includes a calendar function.

At 720, the system may detect what would otherwise be a calendar-triggered reminder for a location-specific event at a certain date and time. For example, the user may have a calendar entry on a certain date for a "meeting in Conference Room F at 2:00 p.m. with the CFO to discuss the annual report." The system may parse the calendar entry and determine that it is location-specific ("Yes" branch at 720) and, at 730 retrieve the specific location to which the user is committed from the calendar entry.

At 740, the system may obtain the current location of the device from its on-board location sensors. At 750, the system may determine whether the user's current location matches the location specified in the calendar entry for the relevant time period. If so ("Yes") branch at 750), the system may cancel the now-superfluous reminder and the process may end at 765. If, on the other hand, the user's location at the time the calendar reminder was set to be triggered does not match the location specified in the calendar entry ("No" branch at 750), the system may allow the calendar reminder to issue.

A system according to the invention may use multiple logical inputs for triggering reminders.

Current implementations of reminders use the user's location or a specific time as a trigger for the reminder. For instance, the user is reminded to call a contact when he/she exits a location or at a specific time, whichever happens earlier. This requires a change in location for all location-based reminders. However, certain scenarios require a logical combination of multiple inputs such as time and location. Furthermore, current implementations are prone to false positives. An example of this is: "Remind me to buy milk when I leave work in the evening." In current implementations, the reminder would be triggered every time the user exits the geo-fence, even if he/she exits for lunch in the afternoon.

Using the process of the present invention it is possible for reminder implementations to use combinatorial logic that uses inputs such as location in conjunction with other inputs such as time, call history, etc. The user can set a complex logical expression instead of a single input based on a geo-fence or time. The reminder triggers only if all conditions are met.

An example of this may be, "remind me to call my father at 6 PM unless I am at work." This uses a combination of the time, as well as the user's current location in the following logical sequence:

```
if ((time == 1800hrs) && (location != work))
    if (no_incoming_or_outgoing_call_to_contact)
        remind user;
    else
        no reminder;
```

Note that the reminder only triggers if all three factors (time, location and whether an incoming or outgoing call has already been placed) are satisfied.

Another example is: "Remind me to pick up milk when I leave home [the office?] in the evening (assuming evening is after 5 PM)."

This may be represented by:

```
if ((time >1700 hrs) &&((time <2400 hrs) && (geo-fence_exited == work))
    remind user;
```

This logic will only trigger a reminder when the user leaves work after 5 PM. It will prevent false positives that include a trigger when the user leaves work for lunch. It also prevents premature reminders at the specified time, in scenarios where the user has not left work until later.

This example can be extended to take into account existing appointments in the user's calendar. If the user has a 1-hour calendar appointment at 5.30 p.m., then the time condition may be automatically changed to 6:30 p.m.

```
if ((time > end_of_last_meeting) && (geo-fence_exited == work))
    remind user;
```

In yet another example, the current location (not a geo-fence exit or entry) AND system time can be used to trigger a reminder such as: "Remind me to call my wife if it is 7 p.m.

AND I am still at work," In this scenario, the user would be reminded only if both the logical conditions were satisfied.

```
If ((time > 1900 hrs) && (current_Location == work))
    if (incoming_or_outgoing_call_to_wife)
        if (time_of_call > 1830 hrs)
            cancel reminder;
        else
            remind user;
    else
        no reminder;
```

Example 7

Figure 8:
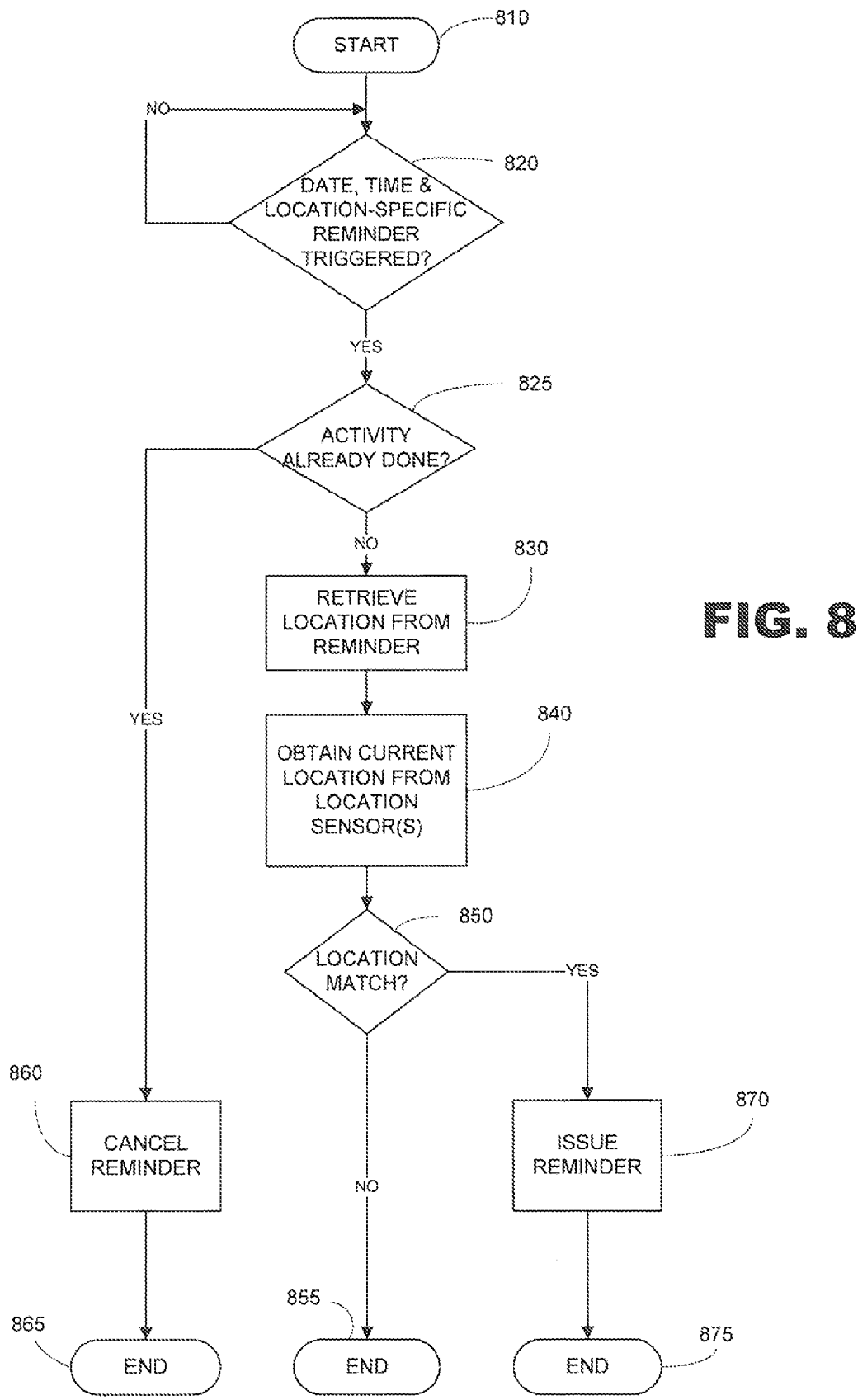
FIG. 8 is flowchart of a process according to a seventh representative embodiment of the invention.

An example of a process using such combinatorial logic is shown in flowchart form in FIG. 8. Such a process might be used in a scenario wherein the user wishes to receive a reminder to "call my father at 6 p.m. unless I am still at work."

The process may begin at 810 with the user activating the function on a personal electronic device that includes a calendar function. At 820 the reminder is triggered by the current time reaching 6 p.m. on the selected date. However, the system makes certain other determinations before issuing the reminder.

At 825 the system may determine whether the call to the user's father has already been made by retrieving data from the device's call history cache. If a call the user's father has been placed within a preselected time ("Yes" branch at 825), the system may cancel the reminder at 860 (inasmuch as it is no longer needed). In this way superfluous or redundant reminders may be avoided.

If, on the other hand, no call to the user's father has recently been made ("No" branch at 825) the system may, at 830, retrieve the location-specific information from the calendar entry and, at 840, obtain the current location of the device (and presumably its user) from on-board location sensors. If the location criterion is satisfied ("Yes" branch at 850) [in this example the user is not still at work], the system proceeds (at 870) to issue the reminder for the user to call his father and the process concludes at 875. If the location criterion is not satisfied ("No" branch at 850) [in this example the user is still at work], the reminder is not issued and the process concludes at 855.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A non-transitory program storage device comprising instructions stored thereon to cause one or more processors to:
   deactivate a previously established notification function on a device comprising the one or more processors based at least in part on data from at least two data sources selected from the group consisting of event history, location history communication history, transaction history, device-stored electronic coupons, calendar entries, current location, current date and current time.

2. A program storage device as recited in claim 1 wherein the communication history is selected from the group consisting of e-mail history, telephone call history, cellular phone system text message history, SMS message history, social media communication history, and wireless digital messaging service communication history.

3. A program storage device as recited in claim 1 wherein at least one of the location history and current location data is derived from a sensor that comprises an apparatus selected from the group consisting of global navigation satellite system receivers, Wi-Fi transceivers, cellular telephone transceivers, indoor positioning system receivers and Assisted GPS receivers.

4. A program storage device as recited in claim 1 wherein data concerning current date and current time are obtained from a network in data communication with the device.

5. A non-transitory program storage device as recited in claim 1 wherein the instructions to deactivate a previously established notification function of a device comprise instructions to:
   suppress a notification to perform a certain activity if performance of the activity is detected within a preselected time period.

6. A processor-based system comprising:
   a processor;
   at least one data storage device; and,
   a memory storing instructions for causing the processor to deactivate a previously established notification function of a device comprising the one or more processors based at least in part on data from at least two data sources selected from the group consisting of event history, location history communication history, transaction history, device-stored electronic coupons, calendar entries, current location, current date and current time.

7. A processor based system as recited in claim 6 wherein the communication history is selected from the group consisting of e-mail history, telephone call history, cellular phone system text message history, SMS message history, social media communication history, and wireless digital messaging service communication history.

8. A processor based system as recited in claim 6 further comprising a location sensor that comprises an apparatus selected from the group consisting of global navigation satellite system receivers, Wi-Fi transceivers, cellular telephone transceivers, indoor positioning system receivers and Assisted GPS receivers.

9. A processor based system as recited in claim 6 wherein data concerning current date and current time are obtained from a network in data communication with the device.

10. A processor based system as recited in claim 6 wherein deactivating a previously established notification function comprises suppressing a notification to perform a certain activity if performance of the activity is detected within a preselected time period.

11. A non-transitory program storage device comprising instructions stored thereon to cause one or more processors to:
   generate a notification on a device comprising the one or more processors based at least in part on data concerning the current location of the device and location-specific electronic coupons stored on the device.

12. A program storage device as recited in claim 11 further comprising instructions to:
   generate a notification if and only if the current location of the device is within a preselected radius of the location specified on an electronic coupon stored on the device.

13. A program storage device as recited in claim 12 further comprising instructions to:
   suppress the notification if the current date exceeds the effective date of the electronic coupon having a specified location within the preselected radius of the current location of the device.

14. A program storage device as recited in claim 12 wherein the electronic coupon concerns at least one of goods, services, discounts, tickets for public transportation, boarding passes, consumer loyalty programs, gift cards and vouchers or tickets for admission to sporting, cultural and entertainment events.

15. A program storage device as recited in claim 1 wherein the change in the operational behavior of a notification function of the device comprising the one or more processors is based at least in part on data from at least three data sources selected from the group consisting of event history, location history communication history, transaction history, device-stored electronic coupons, calendar entries, current location, current date and current time.

16. A program storage device as recited in claim 1 further comprising instructions to suppress a notification if a related notification has been issued within a preselected time interval.

17. A non-transitory program storage device comprising instructions stored thereon to cause one or more processors to:
suppress a previously established notification function on a device comprising the one or more processors based at least in part on the current time and the current location of the device and a change of location of the device.

18. A program storage device as recited in claim 17 wherein the current location of the device is derived from a location sensor that comprises an apparatus selected from the group consisting of global navigation satellite system receivers, Wi-Fi transceivers, cellular telephone transceivers, indoor positioning system receivers and Assisted GPS receivers.

19. A program storage device as recited in claim 17 wherein the change of location comprises moving from a preselected location.

20. A program storage device as recited in claim 17 wherein the change of location comprises moving to a preselected location.

21. A non-transitory program storage device comprising instructions stored thereon to cause one or more processors to:
suppress a previously established notification function on a device comprising the one or more processors based at least in part on the current time and the current location of the device and whether a certain activity has been performed within a preselected interval of time.

22. A program storage device as recited in claim 21 wherein the determination of whether a certain activity has been performed within the preselected time interval comprises retrieving data from communication history stored on the device.

23. A program storage device as recited in claim 21 wherein the determination of whether a certain activity has been performed within the preselected time interval comprises retrieving data from transaction history stored on the device.

* * * * *